(12) United States Patent
Hebenstreit

(10) Patent No.: US 6,459,469 B1
(45) Date of Patent: Oct. 1, 2002

(54) APPARATUS AND METHOD FOR EXPOSING LIGHT-SENSITIVE MATERIAL

(75) Inventor: Jörk Hebenstreit, Bad Klosterlausnitz (DE)

(73) Assignee: Agfa-Gevaert Aktiengesellschaft, Leverkusen (DE)

(*) Notice: Subject to any disclaimer, the term of this patent is extended or adjusted under 35 U.S.C. 154(b) by 0 days.

(21) Appl. No.: 09/535,184

(22) Filed: Mar. 27, 2000

(30) Foreign Application Priority Data

Apr. 15, 1999 (DE) .......................................... 199 17 103

(51) Int. Cl.⁷ ............................ G03B 29/00; G03B 27/58
(52) U.S. Cl. ................................ 355/28; 355/29; 355/72
(58) Field of Search ............................... 355/28, 29, 32, 355/72, 54; 358/288

(56) References Cited

U.S. PATENT DOCUMENTS

| | | | |
|---|---|---|---|
| 4,759,679 A | 7/1988 | Mueller | 414/416 |
| 4,839,740 A | * 6/1989 | Yoshida | 358/288 |
| 5,280,307 A | 1/1994 | Parsons | 346/134 |
| 5,307,114 A | 4/1994 | Nitsch et al. | 355/29 |
| 5,335,045 A | 8/1994 | Kunz et al. | 355/72 |

FOREIGN PATENT DOCUMENTS

| | | |
|---|---|---|
| DE | 2953473 | 5/1980 |
| DE | 3610660 | 3/1986 |
| DE | 3600103 | 7/1986 |
| DE | 4123188 | 11/1992 |
| DE | 19711793 | 10/1997 |
| DE | 19747122 | 10/1997 |
| EP | 0047541 | 3/1982 |
| EP | 0141392 | 5/1985 |
| EP | 0570651 | 11/1993 |
| EP | 0602715 | 6/1994 |

* cited by examiner

Primary Examiner—Russell Adams
Assistant Examiner—Peter B. Kim
(74) Attorney, Agent, or Firm—Milde & Hoffberg, LLP

(57) ABSTRACT

The invention concerns to a device for exposing light-sensitive material, such as photographic paper. The apparatus includes an exposure device (15), an exposure stage (10), at least one magazine (2) for storing a roll of light-sensitive material, a transport device (8) for transporting the light-sensitive material from the magazine (2) to the exposure stage (10) and a cutting device (6) for cutting the light-sensitive material into single sheets. To be able to provide a larger selection of light-sensitive materials for exposing, a cassette (4) for storing light-sensitive material in the form of sheets is provided in the apparatus in addition to the roll magazine (2). A transfer device (11) transfers the sheet material from the cassette (4) to the transport device (8) or directly to the exposure stage (10).

16 Claims, 2 Drawing Sheets

APPARATUS AND METHOD FOR EXPOSING LIGHT-SENSITIVE MATERIAL

BACKGROUND OF THE INVENTION

The invention relates to apparatus as well as to a method for exposing light-sensitive material such as photographic paper. The apparatus includes an exposure device, an exposure stage, at least one magazine for storing a roll of light-sensitive material, a transport device for transporting the light-sensitive material from the magazine to the exposure stage and a cutting device for cutting the light-sensitive material into single sheets.

Such apparatus and methods are known from various patents and patent applications dealing with photographic printing devices.

The published German Patent Application No. DE-OS 197 47 122 describes a photographic printing apparatus with both an analog and a digital exposure unit that is used to expose photographic paper. This apparatus accommodates two paper magazines containing continuous rolls of printing paper. The printing paper is fed from the magazines, cut into single sheets and exposed in the exposure stage or, after removal from the magazine, is conveyed as a strip along a line exposure device, where it is exposed and then cut into individual sheets. The paper magazines are arranged on both sides of the exposure platform such that by choice paper can be taken from one magazine or paper can be taken from the other magazine. The magazines are designed such that paper with different widths or paper coated with different photographic emulsions can be used. This ensures that, with a continuously operating exposure device, two different types or two different widths of paper can be exposed.

However, since today it is common to make photographic prints in many different formats, providing two different paper widths is often not enough to create all desired printing formats in a continuously operating apparatus. To use paper with a third width, the above-noted apparatus must be stopped, the cassettes must be changed and the interrupted printing process must be restarted.

To avoid such an interruption of the printing process when exposing varying paper types or paper widths, the European Patent No. 0,570,651 A1 recommends equipping a photographic printing apparatus with a storage place for several paper cassettes containing rolled paper strip. The mouths of the cassettes are oriented next to one another, perpendicular to the transport direction of the material to be printed. A feeding device, with a carriage that can be moved perpendicular to the transport direction of the material to be printed, moves the material to be printed each time from one cassette mouth to the exposure device.

However, such a paper magazine arrangement consisting of several cassettes with different paper material strips is very large, and, together with the feeding mechanism, takes up a large volume of space in the printing apparatus. Moreover, the feeding device is a very sophisticated and expensive component in the printing apparatus. An additional disadvantage is the loss of time for transporting paper from a more distant cassette to the exposure stage.

SUMMARY OF THE INVENTION

It is, therefore, the principal objective of the present invention to develop an apparatus and method for exposing light-sensitive material, such as photographic paper, where the light-sensitive material can be continuously made available for exposure in a variety of different formats and types and within only a short amount of time.

This objective, as well as other objectives which will become apparent from the discussion that follows, are achieved, according to the invention, by a providing in the apparatus, in addition to the roll magazine, a cassette for storing light-sensitive material in the form of sheets. A transfer device transfers the sheet material from the cassette to the transport device or directly to the exposure stage.

The provision, in addition to the roll magazine, of a sheet cassette with light-sensitive material of a different format or a different surface, for exposure by the exposure device, makes possible the creation of an image on a material of different format or appearance, depending on the material loaded in the sheet cassette. Thus, a sheet cassette increases the possibility for variation with regard to the paper selection in the same way that an additional roll magazine does. However, the paper cassette requires less space and can, therefore, be positioned in close proximity to the exposure stage. Using a simple transfer device, the material from the cassette can be transferred directly to the exposure stage using a transport device, or can be transferred to the transport device that transports the light-sensitive material from the roll magazine to the exposure stage.

Although there is an increased demand for unusual formats, they are still rather rare in comparison to the typical formats provided by the roll magazine. It is, therefore, not necessary to provide an additional large roll of light-sensitive material to the exposure device for the exposure of these unusual formats. For the relatively low utilization of these unusual formats, it is sufficient to provide a stack of sheets of light-sensitive material in the exposure device, such that, on the one hand, the exposure of these formats is possible in the continuous operation of the photographic printing apparatus and, on the other hand, the functionality of the apparatus is not impaired by an over-dimensioned roll magazine. A sheet cassette with a transfer device can be easily accommodated in the apparatus and is significantly less complicated than a storage place with several cassette rolls that require a technically very sophisticated feeding device.

To become even more flexible in material selection, an additional cassette for light-sensitive sheet material can be provided in the exposure device. Depending upon the amount of space available in the apparatus, even three or more sheet cassettes with different materials can be accommodated in the apparatus. If more than one cassette is provided, it is prudent to design the transfer device in such a manner that it can be moved between the cassettes so that, with one movable transfer device, light-sensitive material can be taken from any desired cassette and transported to the exposure stage.

The transfer device described in the German Patent No. 36 10 660 for an X-ray film cassette loading apparatus can be used in the photographic printing apparatus according to the invention. In this X-ray apparatus, the X-ray film sheets are picked up using a suction device that can be moved between various X-ray film sheet cassettes. Of course, this design can be used for all other types of film sheets as well.

Such transfer devices with suction devices for transferring light-sensitive material from a sheet cassette to a conveyer device that transports the light-sensitive material to an image generation device are also suitable for isolating individual sheets when using only one sheet cassette in the exposure device. An example is provided in the German Patent No. 41 23 188.

The transfer device can also be equipped with rolls for removing the sheet material from the cassette. An example of this arrangement is described extensively in the European Patent No. 0,047,541.

If the sheets are removed with the use of rolls, a switching system that funnels the sheets taken from the various cassettes to a common transport path can be used instead of the robot-like moveable transfer device.

To simplify the removal of individual sheets from the cassette, a lifting arm that lifts the stack of sheet material in the cassette may be provided at the bottom of the sheet cassette, such that the top sheet is positioned at the removal slot where it can be easily grasped by the transfer device and removed from the cassette. An example of this device is provided in the German Patent No. 36 00 103.

A sheet cassette can be built into the apparatus and loaded from the outside with a light-tight stack of light-sensitive material. However, the cassette can also be inserted into the apparatus by means of an insertion opening such as an insertion slot. If the cassette is to be inserted into the apparatus by means of a slot, it must be possible to close the slot in a light-tight manner. It is advantageous if the slot is designed such that cassettes of varying sizes can be accommodated. In this case, it is possible to provide various formats and material surfaces for the exposure of images by simply changing handy sheet cassettes.

For example, three different widths of light-sensitive material can be provided for exposure in an exposure device by providing two roll magazines and one cassette. By cutting the roll material into pieces of different lengths, a considerable number of formats can already be realized.

Providing a stack of light-sensitive sheet material in addition to the material rolls is advantageous both for conventional exposure devices that illuminate a film negative and print it onto photographic paper via printing optics and for digital exposure devices that expose scanned image data or, other digital data onto light-sensitive material. With digital apparatus, laser devices, pixel-controlled light modulators that are illuminated by a light source, or light emitting pixel-controlled light sources such as LEDs, can be used as exposure units.

Depending on the exposure unit, either a flat exposure stage or a curved exposure roll can be used, and the transport device for the light-sensitive material must be adapted to it.

For a full understanding of the present invention, reference should now be made to the following detailed description of the preferred embodiments of the invention as illustrated in the accompanying drawings.

DESCRIPTION OF THE PREFERRED EMBODIMENT

Figure 1:
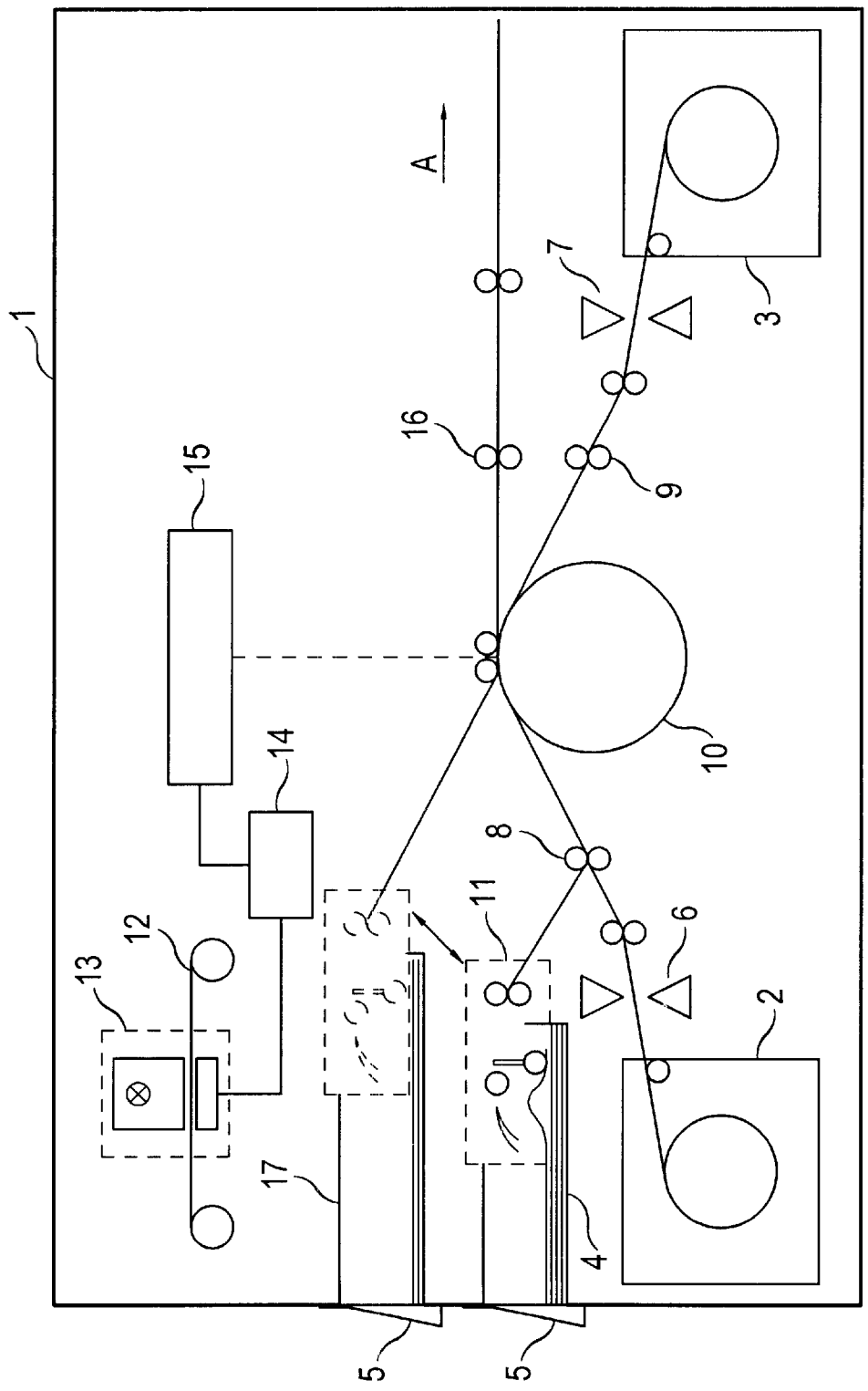
FIG. 1 is a schematic diagram of a device for exposing light-sensitive material according to the invention.

FIG. 1 shows an exemplary embodiment of a digital exposure device 1 where, in addition to the roll magazines 2 and 3, there is provided a cassette 4 for storing sheets of light-sensitive photographic paper. For changing or refilling with new photographic paper, the sheet cassette 4 can be removed through the insertion slot 5 that can be closed with a light-proof cap.

For exposing, the photographic paper is either obtained from a roll magazine 2 or 3, cut into single sheets by the cutting device 6 or 7 and transported to the exposure roll 10 by transporting rolls 8 or 9, or, alternatively, it is removed from the sheet cassette by an extracting device 11 which isolates the top sheet of the stack of photographic paper and is then transported via the transport roll 8 to the exposure roll 10. At the exposure roll 10, digital data, which is obtained, for example, by scanning a photographic film 12 at the scanner unit 13, and which is processed at the image processing computer 14, is exposed by a laser exposing device 15 onto the photographic paper. In the exemplary embodiment, a laser exposing device 15 incorporates three gas or semiconductor lasers of different colors whose emitted light beams are combined into one light path, guided to a mirror polygon and printed onto the photographic paper via an F-Theta lens.

In place of the laser exposing device 15, it is also possible to use laser diodes of different colors that are moved along the photographic paper such that their light is guided across the entire width of the photographic paper.

Finally, the exposed paper is transported in the transport direction A via an additional transport unit 16 to a development unit, not shown here, where it is developed using a chemical process.

The roll magazines 2 and 3 contain different types of photographic paper that can be selected depending upon the roll magazine used for obtaining the paper. It is not necessary that the roll magazines be arranged on each side of the exposure stage. It is also conceivable that both magazines be located on one side of the exposure stage such that the paper of both rolls arrives at the exposure stage along the same transport path. In addition to these roll magazines, at least one sheet cassette 4 is provided which holds an additional type of paper for exposure. This type of paper is either inserted in the form of a stack of single sheets outside of the apparatus into a light-proof cassette that is then inserted into the apparatus, or a light-proof, closed, single sheet stack is inserted into a cassette that is integrated into the apparatus and during insertion is opened with the use of an opening device so that a loose stack of sheets will be present in the sheet cassette of the apparatus. From this stack of sheets, the top sheet is lifted off using an isolation device so that it can be removed from the cassette. The single sheets to be exposed that either come from the sheet cassette or are cut from the roll material are then transported to the exposure station either by rolls as presented in the embodiment shown, or by transport belts or other guiding devices. There, the paper is exposed at the exposure stage: an exposure platform, an exposure roll or any other paper holding device. Exposure is carried out with a digital exposure unit, such as the laser exposure device 15, a light source whose light is modulated using a light modulator, or a self-lighting light source that can be modulated pixel by pixel such as an LED array. With a large-area exposure unit such as an illumination device with an LCD or DMD, it is prudent to place the paper on an exposure platform such that exposure occurs in a large-area manner. With a laser exposure device or other line exposure devices, it is more advantageous to use, for example, an exposure roll where the paper can be moved uniformly from line to line, such that single lines are always exposed, one after the other.

As shown in FIG. 1, the apparatus can be provided with an additional cassette 17 with sheets of photographic paper. This paper can have the same or different format from that contained in the main cassette 4. As indicated in dashed lines the same extracting device 11 can be moved between the two cassettes.

Figure 2:
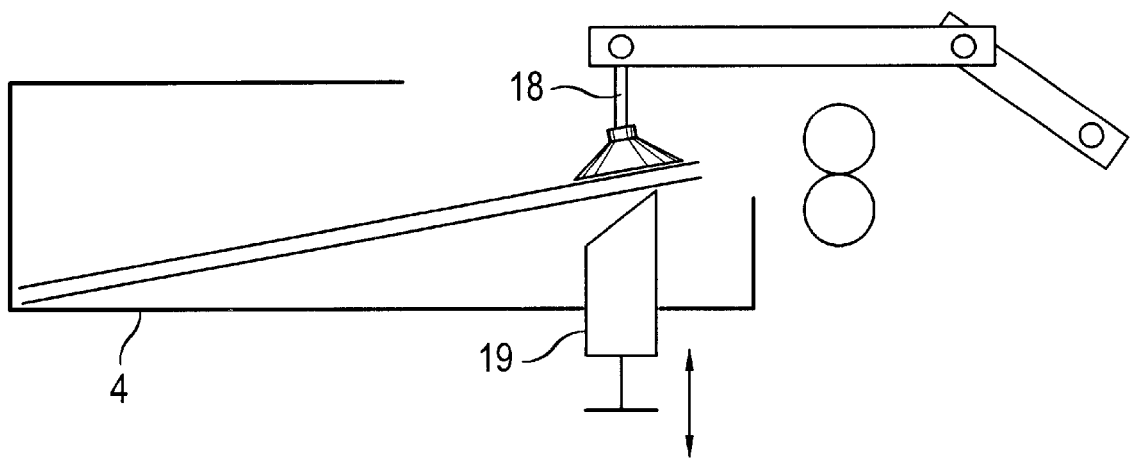
FIG. 2 is a schematic diagram of a cassette with devices for extracting sheets of photographic paper.

FIG. 2 shows how sheets of paper may be isolated and removed from a cassette. In this case the extracting device comprises both a pressure arm 19 for lifting the stack of sheet material in the cassette and a suction device 18 which removes the top sheet from the cassette. In addition, rolls are provided to grasp the individual sheets and draw them away from the cassette.

There has thus been shown and described a novel apparatus and method for exposing light-sensitive material which fulfills all the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In apparatus for exposing light-sensitive material comprising an exposure device, an exposure stage, at least one magazine for storing a roll of light-sensitive material of a first type and a first width, a transport device for transporting the light-sensitive material from the magazine to the exposure stage and a cutting device for cutting the light-sensitive material into single sheets, the improvement comprising a cassette for storing light-sensitive material in the form of sheets of a second type and a second width, and a transfer device for transferring the sheet material from the cassette to the transport device or directly to the exposure stage, at least one of said second type and said second width being different from a corresponding one of said first type and said first width, whereby said light-sensitive material of said first type and said first width is in larger supply, and may be used more frequently, than said light-sensitive material of said second type and said second width.

2. The apparatus as set forth in claim 1, further comprising an additional cassette for light-sensitive material in the form of sheets of a third type and a third width, at least one of said third type and said third width being different from corresponding ones of either said first and said second type and said first and said second width.

3. The apparatus as set forth in claim 2, wherein the transfer device can be moved between the cassettes.

4. The apparatus as set forth in claim 1, wherein the transfer device includes suction devices for removing the sheet material from the cassette.

5. The apparatus as set forth in claim 1, further comprising rolls that grasp the sheets for removing the sheet material from the cassette.

6. The apparatus as set forth in claim 1, further comprising a pressure arm for lifting the stack of sheet material in the cassette.

7. The apparatus as set forth in claim 1, further comprising an insertion slot, where cassettes can be inserted for storing light-sensitive sheet material.

8. The apparatus as set forth in claim 7, wherein the insertion slot is closed light-tight when the cassette is inserted.

9. The apparatus as set forth in claim 1, wherein the light-sensitive sheet material in the cassette has a different width than the width of the material roll in the magazine.

10. The apparatus as set forth in claim 1, further comprising at least one additional magazine for an additional roll of light-sensitive material.

11. The apparatus as set forth in claim 10, wherein light-sensitive material is transported from the additional magazine to the exposure stage using an additional transport device.

12. The apparatus as set forth in claim 11, wherein the two magazines accommodate rolls of light-sensitive material with different widths.

13. The apparatus as set forth in claim 1, wherein the exposure device includes a pixel-controllable exposure unit that can be controlled in accordance with digital image data.

14. The apparatus as set forth in claim 13, wherein the exposure unit includes at least one laser for generating exposure light.

15. The apparatus as set forth in claim 13, wherein the exposure unit includes a pixel-controllable light modulator that is illuminated by an illumination unit.

16. The apparatus as set forth in claim 1, wherein the exposure device includes an illumination unit for illuminating a film to be printed as well as an optical system for exposing the film onto the light-sensitive material.

* * * * *